United States Patent [19]

Miyadera et al.

[11] 3,725,344
[45] Apr. 3, 1973

[54] CROSSLINKED COPOLYMERS OF AROMATIC DIAMINODIAMES, AROMATIC DIAHYDRIDES AND AROMATIC DIAMINES AND METHOD OF PREPARATION

[76] Inventors: Yasuo Miyadera, 33-2, Nishi-Narusawacho-1-chome; Tatuo Masuko, 23-9, Osecho-3-chome; Tadashi Muroi, 67-4, Ishinazakacho; Hiroshi Noguchi, 2-20-274, Takasuzucho-1-chome; Hideo Kawashima, 12-14, Nishi-Narusawacho-1-chome, all of Hitachi, Japan

[22] Filed: Aug. 12, 1970

[21] Appl. No.: 63,276

[30] Foreign Application Priority Data

Aug. 20, 1969 Japan ................................44/66115

[52] U.S. Cl. ........260/47 CP, 117/122 H, 117/124 E, 117/128.4, 117/232, 260/30.2, 260/30.6 R, 260/30.8 R, 260/30.8 DS, 260/32.6 N, 260/49, 260/63 R, 260/65, 260/78 TF, 260/79 R
[51] Int. Cl. .............................................C08g 33/02
[58] Field of Search .......260/47 CP, 78 TF, 78.4, 49, 260/63 R, 65, 79 R

[56] References Cited

UNITED STATES PATENTS 3,461,096  8/1969  Rabilloud et al. ......................260/47
3,541,054  11/1970  Takekoshi ...........................260/78

*Primary Examiner*—William H. Short
*Assistant Examiner*—L. L. Lee
*Attorney*—Craig, Antonelli & Hill

[57] ABSTRACT

A novel copolymer is obtained by subjecting (1) an aromatic diaminodiamide compound whose amino group and amide group are bonded to an aromatic nucleus in a meta or para position to each other and whose amide group is a carboxylic acid amide group or a sulfonic acid amide group, (2) an aromatic tetracarboxylic acid dianhydride and (3) an aromatic diamine to reaction at a temperature not higher than 80°C in the presence of an inert solvent. By dehydrating and cross-linking the copolymer by heating to 100°C or higher, a novel, cross-linked copolymer having a good heat and abrasion resistance is obtained. When said dehydrating and cross-linking reaction is carried out in the form of an electric conductor coating, an electric wire having a good insulation effect is obtained.

16 Claims, No Drawings

CROSSLINKED COPOLYMERS OF AROMATIC DIAMINODIAMES, AROMATIC DIAHYDRIDES AND AROMATIC DIAMINES AND METHOD OF PREPARATION

This invention relates to a heat-resistant polymer having a novel copolymerization form obtained from a diaminodiamide compound, a carboxylic acid anhydride and a diamine, and further relates to a method for preparing the polymer.

Polyimide resins obtained by cyclodehydrating a polyamide acid compound obtained by reaction of a diamine with a carboxylic acid dianhydride are widely known as an engineering material. The polymers are characteristic particularly of their excellent heat resistance. For example, the polymers are widely used as a film-forming material, fiber-forming material, molding material, insulation material, or impregnating material. They are preferable polymers with respect to many properties except for a few characteristics in some application. However, when the polymers are actually used, there are sometimes considerable limitations to the application, depending upon their uses, in spite of such many excellent characteristics. For example, a strong friction sometimes occurs in a coiling step when the polymers are used as an isnulation film for insulated electric wires. The polyimide resins are considerably inferior in abrasion resistance to other resins for insulation film. Therefore, the insulation films are often damaged. Further, the polyimide resins have substantially no resistance to chemicals, particularly, to the action of an alkali. Accordingly, it is necessary to pay a careful attention to these mechanical and chemical actions when the polyimide resins are employed. In this sense, there are limitations to the application of the polyimide resins.

An object of the present invention is to provide a novel polymer having characteristics equal or superior to those of the polyimide resins.

Another object of the present invention is to provide a novel polymer having very excellent mechanical characteristics, particularly in the abrasion resistance.

A further object of the present invention is to provide a novel polymer having a good alkali resistance.

Other objects and advantages of the present invention will become clear from the following description.

The present polymer can be obtained by subjecting a specific diaminodiamide compound, an aromatic tetracarboxylic acid dianhydride and an aromatic diamine to reaction.

As the diaminodiamide compound, an aromatic compound, whose amino group and amide group are bonded to the aromatic nucleus in a meta or para position to each other, is used. The amide group is a carboxylic acid amide group or a sulfonic acid amide group.

The diaminodiamide compound is represented by the following general formulae:

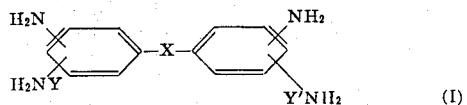

(I)

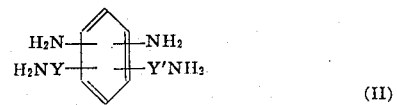

(II)

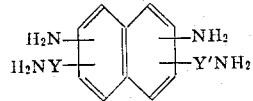

(III)

In the above formulae (I) to (III), Y and Y' represent $SO_2$ or CO groups and may be same or different. X represents O, $CH_2$, $SO_2$, S, CO or a linkage. The $NH_2$ group and the $YNH_2$ group as well as the $NH_2$ group and the $Y'NH_2$ group are bended to an aromatic nucleus in a meta or para position to each other.

The diaminodiamide compounds include, for example, 4,4'-Diaminodiphenylether-2,2'-disulfonamide,
4,4'-Diaminodiphenylether-2,2'-dicarbonamide,
3,3'-Diaminodiphenylether-6,6'-disulfonamide,
4,4'-Diaminophenylmethane-2,2'-disulfonamide,
4,4'-Diaminodiphenlmethane-2,2'-dicarbonamide,
3,3'-Diaminodiphenylmethane-6,6'-disulfonamide,
4,4'-Diaminodiphenylsulphone-2,2'-disulfonamide,
4,4'-Diaminodiphenylsulphone-2,2'-dicarbonamide,
3,3'-Diaminodiphenylsulphone-5,5'-disulfonamide,
4,4'-Diaminodiphenylsulfide-2,2'-disulfonamide,
4,4'-Diaminodiphenylsulfide-2,2'-dicarbonamide,
4,4'-Diaminobenzophenone-2,2'-disulfonamide,
4,4'-Diaminobenzophenone-2,2'-dicarbonamide,
3,3'-Diaminobenzophenone-5,5'-disulfonamide,
4,4'-Diaminodiphenyl-2,2'-disulfonamide,
4,4'-Diaminodiphenyl-2,2'-dicarbonamide,
1,6-Diaminobenzene-3,4-disulfonamide,
1,6-Diaminobenzene-3,4-dicarbonamide,
1,5-Diaminonaphthalene-3,7-disulfonamide,
1,5-Diaminonaphthalene-3,7-dicarbonamide,
1,5-Diaminonaphthalene-4,8-disulfonamide,
1,5-Diaminonaphthalene-4,8-dicarbonamide,
2,6-diaminonaphthalene-4,8-disulfonamide,
2,6-Diaminonaphthalene-4,8-dicarbonamide, etc.

As the aromatic tetracarboxylic acid dianhydride, for example, the following compounds are used: pyromellitic dianhydride; 3,3''-benzophenone tetracarboxylic acid dianhydride; 3,3',4,4'-diphenyltetracarboxylic acid dianhydride; 2,3,6,7-naphthalene tetracarboxylic acid dianhydride; 1,4,5,8-naphthalene tetracarboxylic acid dianhydride; 3,4,9,10-perylene-tetracarboxylic acid dianhydride; 4,4'-sulfonyldiphthalic acid dianhydride, etc.

As the aromatic diamine, meta-phenylenediamine, para-phenylenediamine, 4,4'-diaminodiphenylether, 4,4'-diaminodiphenylsulfone, 4,4'-diaminodiphenylmethane, 4,4'-diaminodiphenyl sulfide, 4,4'-diaminodiphenyl propane, 3,3'-diaminodiphenylsulfone, 1,5-diaminonaphthalene, 2,6-diaminonaphthalene, etc. are used.

These aromatic diaminodiamide compounds, aromatic tetracarboxylic acid dianhydrides and aromatic diamines undergo reaction among their amino groups, amide groups and acid anhydride groups, irrespective of their aromatic nuclei. Therefore, any compound can be used in the present invention, so long as the aromatic nuclei of the compounds having said functional groups do not react with said functional groups. In this sense, the objects of the present invention can be equally attained when any of said compounds is used, and a polymer having no essential differences in physical properties can be obtained.

At least two kinds each of the diaminodiamide compounds, tetracarboxylic acid dianhydrides and diamines may be used for reaction at the same time. It is desirable to use the diaminodiamide compounds and the diamines at a ratio of the former to the latter of 95 – 5 percent by mole to 5 – 95 percent by mole. When the diaminodiamide compound is used in an amount larger than the diamine, the density of cross-linking of the thus obtained polymer tends to be increased, and the desired polymer becomes more rigid.

On the contrary, when the diamine is used in an amount more than the diaminodiamide compound, the density of cross-linking of the thus obtained copolymer tends to be decreased, and the polymer becomes softer.

It is desirable to use the tetracarboxylic acid dianhydride in a molar amount equal to the total moles of the diaminodiamide compound and the diamine. In that case, the molecular weight of the desired polymer is increased to a maximum, and a polymer having the most satisfactory properties, particularly in mechanical strength, etc. can be obtained.

According to the reaction formula of the present invention, the diaminodiamide compound, the diamine and the acid anhydride undergo reaction to form an intermediate polymer in the following manner:

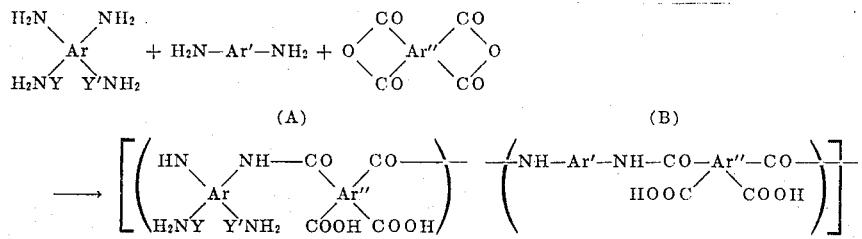

where Ar, Ar' and Ar" represent the individual aromatic nuclei.

The intermediate copolymer is a copolymer consisting of units (A) and (B) combined at random or in blocks or alternately, and the ratio of the unit (A) to the unit (B) can be adjusted by adjusting the ratio of the diaminodiamide compound to the diamine. The preferable ratio of the diaminodiamide compound to the diamine is, as described above, 95 – 5 percent by mole : 5 – 95 percent by mole. Accordingly, the ratio of the unit (A) to the unit (B) of the above formula changes according to the ratio of the diaminodiamide compound to the diamine. The molecular weight of the intermediate copolymer is about 2,000 to 100,000.

When the unit (A) is to be alternately combined with the unit (B), the desired alternate combination can be attained, for example, by reacting one mole of a diamine (or a diaminodiamide compound) with two moles of tetracarboxylic acid dianhydride at first and then additionally reacting one mole of the diaminodiamide compound (or the diamine) with the resulting product after the completion of the first reaction.

When the diaminodiamide compound, tetracarboxylic acid dianhydride and diamine are subjected to reaction directly without any intermediate step, an intermediate copolymer having a block or random structure of the units (A) and (B) can be obtained.

The terminal group of the intermediate copolymer is a reaction residue group of any of the diaminodiamide compound, tetracarboxylic acid dianhydride, or diamine.

The reaction is carried out in an inert solvent, but it is not always necessary that the solvent is capable of dissolving all of the diaminodiamide compound, tetracarboxylic acid dianhydride, and diamine. In detail, one or more kinds of the following solvents are used as a solvent for the reaction system: n-methyl-2-pyrrolidone; N,N-dimethylacetoamide; N,N-dimethylformamide; N,N-diethylformamide; dimethylsulfoxide; hexamethylphosphoramide; tetramethylene-sulfone, etc.

It is necessary to keep the temperature of the reaction system at about 80°C or lower, and more preferably at about room temperature or lower.

Then, the intermediate polymer is heated to a temperature of about 100°C or higher or subjected to a treatment with a dehydrating agent to be dehydration-cyclized and cross-linked, whereby the desired end polymer of the present invention is produced.

The treatment with dehydrating agent may be carried out according to the method well known to those skilled in the art. For example, various acid anhydrides, sulfuric acid, polyphosphoric acid, etc. are used as the dehydrating agent. By heating the intermediate polymer in the presence of the dehydrating agent, the dehydration-cross-linking reaction can be accelerated.

As is clear from the foregoing explanation, two kinds of the copolymers are obtained according to the present invention. However, these two kinds of copolymers should not be discussed separately, because the intermediate copolymer cannot be utilized industrially as it is, and is always converted to the desired end copolymer by dehydration. Further, the desired end copolymer cannot be obtained without forming the intermediate copolymer.

Therefore, it is necessary to understand that these two kinds of the copolymers are in an unseparable relation to each other in the present invention.

Various actual means are available for converting the intermediate copolymer to the desired end copolymer, depending upon the desired application of the desired end copolymer, and thus in this sense the intermediate copolymer may be often treated as a product in the actual application, though the intermediate copolymer is not applied as it is. For example, the intermediate copolymer can be often shaped into a tape form, or transformed into a paint form or kept in a granular form.

The end copolymer of the present invention has particularly excellent resistance to abrasion, chemicals and heat, and therefore is very useful as an electrically insulating material, or for lamination bonding or molding.

When the desired end copolymer is applied to an actual industrial product, it is desirable to properly select the time when the dehydrating cross-linking is carried out, that is, the time when the intermediate copolymer is changed to the desired end copolymer by dehydrating-cross-linking effected by the heating or dehydration by means of the dehydrating agent.

For example, when the desired end copolymer is applied as an insulating film for insulated wires, a paint containing the intermediate copolymer in a solution form is applied onto a conductor and the applied conductor is then heated, whereby an insulating film comprising the desired end copolymer is formed on the conductor.

Further, when the desired end copolymer is used as a molding resin, the granular intermediate copolymer is packed into a mold and heated, whereby a molding comprising the desired end copolymer can be obtained.

When the dehydrating agent is added to the intermediate copolymer at the packing into the mold, the reaction time of the intermediate copolymer into the desired end copolymer can be shortened.

When the desired end product is applied to the field where any heat load is prohibited, the intermediate copolymer can be changed into the desired end copolymer only by means of the dehydrating agent without any heating treatment.

Furthermore, when the desired end product is used as an insulating film, the intermediate copolymer molded in a film form is applied to an electrical appliance, and then heated, or a type of the desired end copolymer, which has been subjected to dehydrating-cross-linking in advance, can be directly applied to the electrical appliance.

The most effective application of a tape of the intermediate copolymer is for the conductor for electric wires. That is, the tape of the intermediate copolymer is wrapped around the conductor and heated, whereby the desired insulated electric wires can be obtained. The insulated electric wires can have various desired thicknesses by adjusting the thickness of the tape. The thus obtained insulated electric wires can be widely used, for example, as wirings within various machines and equipments or electric wires for aircrafts, owing to excellent mechanical strength and excellent resistance to chemicals and heat of the desired end copolymer constituting the insulating coating. In brief, it is desirable in the present invention to decide, sufficiently in view of the object to which the desired end copolymer is applied and the workability, etc. of the desired end copolymer, the time when the intermediate copolymer is subjected to dehydrating-cross-linking reaction to the desired end copolymer.

When the diaminodiamide compound, tetracarboxylic acid dianhydride and diamine are subjected to the reaction in the presence of the inert solvent in the present invention, it is not necessary to make these three components present in the reaction system at the same time from the beginning. That is, two components can be added to the inert solvent at first, and then the remaining component can be added thereto.

Progress of the reaction can be confirmed by an elevation of a viscosity of the reaction system.

Heretofore, an art comprising reacting, for example, a tetracarboxylic acid dianhydride with a triamine or a tetramine to form an intermediate copolymer and then dehydrating-cross-linking the resulting intermediate copolymer to form a heat-resistant polymer has been known. In said art, it is necessary to effect reaction of only two amino groups with the tetracarboxylic acid dianhydride at the stage of the intermediate copolymer formation, but sometimes all the amino groups undergo the reaction, depending upon reaction conditions.

On the other hand, in the present invention, there is a much less possibility for occurrence of the reaction between the amide group and the tetracarboxylic acid dianhydride in the course of the intermediate copolymer, in the case of the diaminodiamide compound as used in the present invention. Therefore, any especially strict condition is not required for the reaction system, and the reaction can be advantageously and efficiently carried out in a stable state. This is one of the important advantages of the present invention.

When the present invention is carried out in the form of a varnish, it is usual to apply a varnish in which the inert solvent used in the reaction system contains the formed intermediate copolymer in a solution, directly to a practical use.

In order to increase the solubility of the solvent towards the intermediate copolymer, lithium chloride, magnesium chloride, etc. are sometimes added to the solvent.

As an extender for the inert solvent of the reaction system or the solvent for the coating, or for other purposes, naphtha, xylene, toluene, benzene, etc. are sometimes added to the solvent.

Now, the present invention will be explained in detail hereunder, referring to examples.

EXAMPLE 1

Into a three-necked flask having a 200-cc capacity provided with a thermometer, a stirrer and a calcium chloride tube were charged 35.8 g of 4,4'-diaminodiphenylether-2,2'-disulfonamide, and 20.0 g of 4,4'-diaminodiphenylether. Further, 500 cc of N-methyl-2-pyrrolidone and 500 cc of N,N'-dimethyl acetamide were added thereto. The mixture was sufficiently stirred and cooled on ice bath.

Then, 64.4 g of 3,3',4,4'-benzophenonetetracarboxylic acid dianhydride was added little by little to the solution with stirring.

The viscosity of the reaction system was considerably increased after the addition, but the reaction was continued as it was, for 7 hours, with stirring.

A portion of the reaction solution was placed in methanol and the intrinsic viscosity, $\eta sp/c$, of the precipitated reaction product (intermediate copolymer) was measured, and a value of 0.92 dl/g (dimethylsulfoxide was used as a solvent; solution concentration: 0.1 g/100 cc; temperature: 30°C) was obtained. The reaction solution was allowed to flow over a glass plate and a tough film consisting of the intermediate copolymer was obtained by removing the solvent by evaporation.

On the other hand, said reaction solution was applied to a copper conductor and the coated conductor was led to a heating furnace at 450°C. By repetition of these operations, the desired insulated electric wire was obtained. By said baking operation, the component of the film underwent dehydrating-cross-linking from the intermediate copolymer to the desired end copolymer, whereby the insulating film had excellent resistance to abrasion, chemicals and heat as shown in Table 1.

EXAMPLE 2

Into the same flask as in EXAMPLE 1 were charged 35.8 g of 4,4'-diaminodiphenylether-2,2'-disulfonamide and 60.0 g of 4,4'-diaminodiphenylether. Further, 1,200 cc of N-methyl-2-pyrrolidone was added thereto, and the mixture was sufficiently stirred and cooled on ice bath.

Then, 128.8 g of 3,3',4,4'-benzophenonetetracarboxylic acid dianhydride was added little by little to the solution, and the reaction was continued for 7 hours with stirring after the addition. The $\eta$sp/c of the intermediate copolymer, the reaction product, was 0.76 dl/g (under the same conditions as in EXAMPLE 1).

The film of the intermediate copolymer obtained in the same manner as in EXAMPLE 1 had a strength high enough to withstand the ordinary tension wrapping operation. The desired insulated electric wire was prepared by the same operations as in EXAMPLE 1, using said reaction solution.

EXAMPLE 3

In the same flask as in EXAMPLE 1 were charged 35.8 g of 4,4'-diaminodiphenylether-2,2'-disulfonamide and 180 g of 4,4'-diaminodiphenylether. Further, 1,200 cc of N-methyl-2-pyrrolidone, 600 cc of N,N-dimethylacetamide and 200 cc of naphtha were added thereto, and the mixture was sufficiently stirred and cooled on ice bath.

Then, 163.5 g of pyromellitic dianhydride and 80.5 g of 3,3''-benzophenonetetracarboxylic acid dianhydride were added little by little to the solution, and the reaction was continued for 5 hours with stirring after the addition.

The $\eta$sp/c of the intermediate copolymer, a reaction product, was measured under the same conditions as in EXAMPLE 1, and was found to be 0.72 dl/g.

Then, said reaction solution was allowed to flow over a glass plate, and a film of the intermediate copolymer was formed by evaporating the solvent by heating. Then, the film was heated to 450°C, whereby a film of the desired end copolymer having a thickness of 0.05 mm was obtained.

The characteristics of the film of the desired end copolymer had excellent resistance to abrasion, alkali and heat, as shown in Table 1.

In Table 1, a polyimide film, "Kapton," made by Dupont de Nemours and Company is shown as a comparative example.

TABLE 1

| | Present Example | Comparative Example |
|---|---|---|
| Thickness (mm) | 0.05 | 0.05 |
| Tensile strength (kg/mm²) | 12.1 | 21.2 |
| Elongation at break (%) | 17.2 | 17.2 |
| Elmendrof tear strength (g) | 39.7 | 27.3 |
| Abrasion resistance (amount of abrasion: mg) [Taber type abrasion tester, load: 500 g; 100 reciprocations] | 5.1 | 7.3 |
| Alkali resistance [10% NaOH, room temperature; 24 hrs.] | No change | Swollen |
| Cut-through temperature (°C) [load: 1 kg] | 400< | 400< |
| Breakdown voltage (kV/0.1 mm) | 14.2 | 18.0 |
| Dielectric tangent (23°C) | 0.016 | 0.004 |
| Dielectric constant (23°C) | 3.4 | 3.5 |

On the other hand, the desired insulated electric wire was prepared from said reaction solution by the same operations as in EXAMPLE 1.

EXAMPLE 4

Into the same flask as in EXAMPLE 1 were charged 35.75 g of 4,4'-diaminodiphenylether-2,2'-dicarbonamide, 75.0 g of 4,4'-diaminodiphenylether, and 1,000 cc of N,N-dimethylacetamide, and the mixture was sufficiently stirred and cooled on ice bath.

Then, 81.75 g of pyromellitic acid dianhydride and 40.25 g of 3,3',4,4'-benzophenonetetracarboxylic acid dianhydride were slowly added to the solution, and the reaction was continued for 10 hours while stirring the reaction system. The $\eta$sp/c of the intermediate copolymer, a reaction product, was measured under the same conditions as in EXAMPLE 1 and was formed to be 0.73 dl/g. An insulated electric wire was obtained by the same operation as in EXAMPLE 1, using the thus obtained reaction solution.

A film of the intermediate copolymer obtained in the same manner as in Example 1 had a strength high enough to withstand the ordinary, tension wrapping operation.

EXAMPLE 5

Into the same flask as in EXAMPLE 1 were charged 35.80 g of 4,4'-diaminodiphenylether-2,2'-disulfonamide and 59.4 g of 4,4'-diaminodiphenylmethane. Further, 700 cc each of N-methyl-2-pyrrolidone and N,N-dimethyl acetamide were added thereto. The mixture was sufficiently stirred and cooled on ice bath.

Then, 128.80 g of 3,3',4,4'-benzophenonetetracarboxylic acid dianhydride was added little by little to the solution, and the reaction was continued for 6 hours with stirring after the addition.

The desired insulated electric wire was obtained by the same operation as in EXAMPLE 1, using said reaction solution. The $\eta$sp/c of the intermediate copolymer prepared in the same manner as in EXAMPLE 1 from the reaction solution was measured and found to be 0.85 dl/g. A film of the intermediate copolymer had a strength high enough to withstand the tension wrapping operation.

EXAMPLE 6

Into the same flask as in EXAMPLE 1 were charged 35.85 g of 4,4'-diaminodiphenylether-2,2'-disulfonamide, 20.0 g of 4,4'-diaminodiphenylether and 21.20 g of 4,4'-diaminobenzophenone. Then, 500 cc of N-methyl-2-pyrrolidone and 300 cc of N,N'-dimethylacetamide were added thereto. The mixture was sufficiently stirred and cooled on ice bath.

Then, 64.45 g of 3,3',4,4'-benzophenonetetracarboxylic acid dianhydride and 21.80 g of pyromellitic dianhydride were added little by little to the solution and the reaction was continued for 5 hours with stirring after the addition.

The desired insulated electric wire was obtained by the same operations as in EXAMPLE 1, using said reaction solution.

The $\eta$sp/c of the intermediate copolymer was measured under the same conditions as in Example 1 and was found to be 0.78 dl/g. A film of the intermediate copolymer had a strength high enough to withstand the ordinary tension-wrapping operation.

EXAMPLE 7

Into the same flask as in EXAMPLE 1 were charged 35.8 g of 4,4'-diaminodiphenylether-2,2'-disulfonamide, 60.0 g of 4,4'-diaminodiphenylether and 10.80 g of paraphenylenediamine. Further, 800 cc of N-methyl-2-pyrrolidone and 200 cc of N,N-dimethylacetamide were added thereto, and the mixture was sufficiently stirred and cooled on ice bath.

Then, 161.1 g of 3,3',4,4'-benzophenonetetracarboxylic acid dianhydride was added little by little to the solution and the reaction was continued for 12 hours with stirring after the addition.

The desired insulated electric wire was obtained by the same operations as in EXAMPLE 1, using said reaction solution.

The $\eta sp/c$ of the intermediate copolymer under the conditions of EXAMPLE 1 was 0.82 dl/g, and a film-shaped material of the intermediate copolymer had a strength high enough to withstand the ordinary tension wrapping operation.

In Table 2, the various properties of the insulated electric wires obtained according to Examples 1 to 7 are summarized, and it is recognized that the insulated electric wires have excellent characteristics with respect to resistance to abrasion, alkali and heat. In Table 2, an insulated electric wire prepared by the same operations as in EXAMPLE 1, using a polyimide paint, "Pyre ML," made by Dupont de Nemours and Company, is shown as a comparative example.

mide compound, whose amino and amide groups are bonded to an aromatic nucleus in a meta or para position to each other, said amide group being a carboxylic acid amide group or a sulfonic acid amide group with (2) an aromatic tetracarboxylic acid dianhydride and (3) an aromatic diamine in the presence of an inert solvent at a temperature of not more than 80°C. thereby to form a reaction product consisting essentially of the following repeating units:

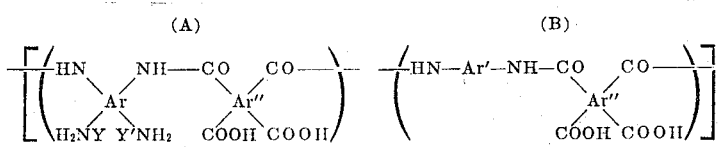

wherein Ar, Ar' and Ar'' are aromatic nuclei, Y and Y' are CO or $SO_2$, and $YNH_2$ and NH as well as $Y'NH_2$ and NH are bonded to Ar in a meta or para position to each other, the ratio of (A) to (B) being 9.5 – 0.5 : 0.5 – 9.5, and (A) and (B) being bonded in a desired order, and then heating the reaction product at a temperature not lower than 100°C thereby to effect dehydrating-cross-linking of the reaction product.

2. A method according to claim 1, wherein (1) the aromatic diaminodiamide compound is at least one member selected from the group consisting of 4,4'-diaminodiphenylether-2,2'-disulfonamide and 4,4'-diaminodiphenylether-2,2'-dicarbonamide, (2) the aromatic tetracarboxylic acid dianhydride is at least one member selected from the group consisting to benzophenonetetracarboxylic acid dianhydride and pyromellitic dianhydride, and (3) the aromatic diamine is at least one member selected from 4,4'-diaminodiphenylether, 4,4'-diaminodiphenylmethane, 4,4'-diaminobenzophenone and paraphenylenediamine.

TABLE 2

| | Example | | | | | | | Comparative example |
|---|---|---|---|---|---|---|---|---|
| | 1 | 2 | 3 | 4 | 5 | 6 | 7 | |
| Conductor diameter (mm.) | 1,000 | 1,000 | 1,000 | 1,000 | 1,000 | 1,000 | 1,000 | 1,000 |
| Film thickness (mm.) | 0.039 | 0.040 | 0.040 | 0.039 | 0.040 | 0.040 | 0.040 | 0.040 |
| Pinholes (number/5 m.) | 0 | 0 | 0 | 0 | 0 | 0 | 0 | 0 |
| Flexibility: | | | | | | | | |
| Normal state | Good | Good | Good | Good | Good | Good | Good | Good |
| 250° C., 24 hrs. after aging | Good | Good | Good | Good | Good | Good | Good | Good |
| Cut-through temperature (° C.) (load: 1 kg.) | <400 | <400 | <400 | <400 | <400 | <400 | <400 | <400 |
| Heat shock (300° C., 1 hr.) | Good | Good | Good | Good | Good | Good | Good | Good |
| Abrasion resistance (frequency) (NEMA repeating type) | <300 | 243 | 114 | 228 | 218 | <300 | 253 | 19 |
| Pencil hardness | 7H | 6H | 6H | 6H | 6H | 7H | 7H | 4H |
| Number of twistings till peeling (20 cm.) | 63 | 71 | 87 | 68 | 82 | 69 | 88 | 83 |
| Breakdown voltage (pair twisting): | | | | | | | | |
| Normal state | 10,200 | 11,000 | 10,100 | 10,700 | 11,200 | 10,800 | 12,000 | 11,000 |
| 300° C., 24 hrs. after aging | 10,400 | 10,300 | 10,700 | 10,100 | 11,000 | 11,200 | 12,300 | 10,500 |
| Chemical resistance (pencil hardness) (room temperature 24 hrs.): | | | | | | | | |
| $H_2SO_4$ (specific gravity: 1.12) | 7H | 6H | 6H | 6H | 6H | 7H | 7H | 4H |
| NaOH (10%) | 6H | 5H | 5H | 5H | 5H | 5H | 5H | (¹) |
| Solvent resistance (pencil hardness) (room temperature 24 hrs.): | | | | | | | | |
| $C_2H_5OH$ | 7H | 6H | 6H | 6H | 6H | 7H | 7H | 4H |
| Benzene | 7H | 6H | 6H | 6H | 6H | 6H | 7H | 4H |

¹ Swollen.

NOTE.—Flexibility refers to possibility of winding an insulated wire around a wire having the same diameter as that of the insulated wire.

What we claim is:

1. A method for preparing a cross-linked copolymer, which comprises reacting (1) an aromatic diaminodia- 3. A method according to claim 2, wherein the aromatic diaminodiamide compound is 4,4'-diaminodiphenylether-2,2'-disulfonamide, the aromatic tetra-carboxylic acid dianhydride is 3,3',4,4'-tetracarboxylic acid dianhydride, and the aromatic diamine is 4,4'-diaminodiphenylether.

4. A method according to claim 2, wherein the aromatic diaminodiamide compound is 4,4'-diaminodiphenylether-2,2'-disulfonamide, the aromatic tetracarboxylic acid dianhydride is a mixture of 3,3',4,4'hydride and pyromellitic dianhydride, and the aromatic diamine is 4,4'-diaminodiphenylether.

5. A method according to claim 2, wherein the aromatic diaminodiamide compound is 4,4'-diaminodiphenylether-2,2'-dicarbonamide, the aromatic tetracarboxylic acid dianhydride is a mixture of 3,3',4,4'hydride and pyromellitic dianhydride, and the aromatic diamine is 4,4'-diaminodiphenylether.

6. A method according to claim 1, wherein Y and Y' are $SO_2$.

7. A method according to claim 2, wherein Y and Y' are $SO_2$.

8. A crosslinked copolymer obtained by reacting in the presence of an inert solvent at a temperature of more than 80° C the following:
   1. an aromatic diaminodiamide compound whose amino and amide groups are bonded to an aromatic nucleus in a meta- or para-position to each other, said amide group being a carboxylic acid amide group or a sulfonic acid amide group;
   2. an aromatic tetracarboxylic acid dianhydride; and
   3. an aromatic diamine the ratio of the diaminodiamide to the diamine being from 5 : 95 mol per cent to 95 : 5 mol per cent and then heating the resulting reaction product at a temperature not lower than 100°C whereby said reaction product is dehydrated-cross linked thereby producing said cross-linked copolymer.

9. The cross linked copolymer according to claim 8, wherein said aromatic diaminodiamide compound is at least one member selected from the group consisting of 4, 4'-diaminodiphenylether-2,2'-disulfonamide and 4,4'-diaminodiphenylether-2,2'-dicarbonamide, said aromatic tetracarboxylic acid dianhydride is at least one member selected from the group consisting of benzophenonetetracarboxylic acid dianhydride and pyromellitic dianhydride, and said aromatic diamine is at least one member selected from the group consisting of 4,4'-diaminodiphenylether, 4,4'-diaminodiphenylmethane, 4,4'-diaminobenzophenone and paraphenylene-diamine.

10. The cross linked copolymer according to claim 9, wherein said aromatic diaminodiamide compound is 4,4'-diaminodiphenylether-2,2'-disulfonamide, said aromatic tetracarboxylic acid dianhydride is 3,3',4,4'-benzophenone-tetracarboxylic acid dianhydride, and said aromatic diamine is 4,4'-diaminodiphenylether.

11. The cross linked copolymer according to claim 9, wherein said aromatic diaminodiamide compound is 4,4'-diaminodiphenylether-2,2'-disulfonamide, said aromatic tetracarboxylic acid dianhydride is a mixture of 3,3',4,4'-benzophenonetratracarboxylic acid dianhydride and pyromellitic dianhydride, and said aromatic diamine is 4,4'-diaminodiphenylether.

12. The cross linked copolymer according to claim 8, wherein said aromatic diaminodiamide compound is 4,4'-diaminodiphenylether-2,2'-dicarbonamide, said aromatic tetracarboxylic acid dianhydride and pyromellitic dianhydride, and said aromatic diamine is 4,4'-diaminodiphenylether.

13. The cross linked copolymer according to claim 8, wherein said diaminodiamide compound is an aromatic diaminodisulfonamide.

14. The cross linked copolymer according claim 9, wherein the aromatic diaminodiamide compound is 4,4'-diaminodiphenylether-2,2'-disulfonamide.

15. The cross linked polymer according to claim 8, wherein the amount of tetracarboxylic acid dianhydride used is in a molar amount equal to the total moles of the diaminodiamide compound and the diamine compound.

16. The cross linked polymer according to claim 9, wherein the amount of tetracarboxylic acid dianhydride used is in a molar amount equal to the total moles of the diamino diamide compound and the diamine compound.

* * * * *

UNITED STATES PATENT OFFICE
CERTIFICATE OF CORRECTION

Patent No. 3,725,344            Dated April 3, 1973

Inventor(s) Yasuo MIYADERA, Tatuo MASUKO, Tadashi MUROI, Hiroshi NOGUCHI and Hideo KAWASHIMA It is certified that error appears in the above-identified patent and that said Letters Patent are hereby corrected as shown below:

In Column 1,

After line 14, insert

--Assignee: Hitachi, Ltd., Hitachi Cable, Ltd. and Hitachi Chemical Co., Ltd., Tokyo, Japan--

Signed and sealed this 13th day of November 1973.

(SEAL)
Attest:

EDWARD M. FLETCHER, JR.
Attesting Officer

RENE D. TEGTMEYER
Acting Commissioner of Patents